(No Model.) 2 Sheets—Sheet 1.

I. SHANEMAN.
FLOUR BOLT.

No. 306,289. Patented Oct. 7, 1884.

Attest:
T. Walter Fowler
M. Johnson

Inventor
Irvin Shaneman.
per: Thomas P. Kinsey
atty.

(No Model.) 2 Sheets—Sheet 2.

I. SHANEMAN.

FLOUR BOLT.

No. 306,289. Patented Oct. 7, 1884.

Attest:
S. Walter Fowler
E. W. Johnson

Inventor:
Irvin Shaneman,
per.
Thomas P. Kinsey
atty

UNITED STATES PATENT OFFICE.

IRVIN SHANEMAN, OF READING, PENNSYLVANIA.

FLOUR-BOLT.

SPECIFICATION forming part of Letters Patent No. 306,289, dated October 7, 1884.

Application filed January 30, 1884. (No model.)

*To all whom it may concern:*

Be it known that I, IRVIN SHANEMAN, a citizen of the United States, residing at the city of Reading, county of Berks, State of Pennsylvania, have invented a new and useful Improvement in Flour-Bolts, of which the following is a specification.

The drawings herewith, in which similar letters indicate similar parts, show clearly my improvements, in which—

Figure 1:
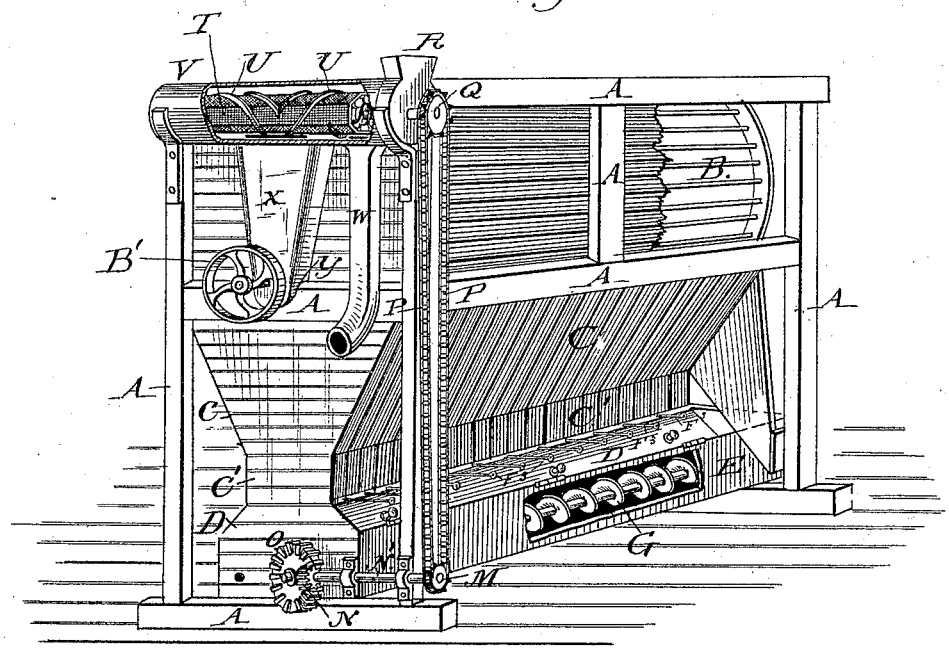
Figure 3:
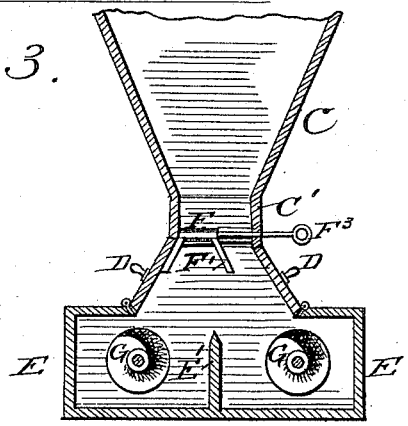
Figure 2:
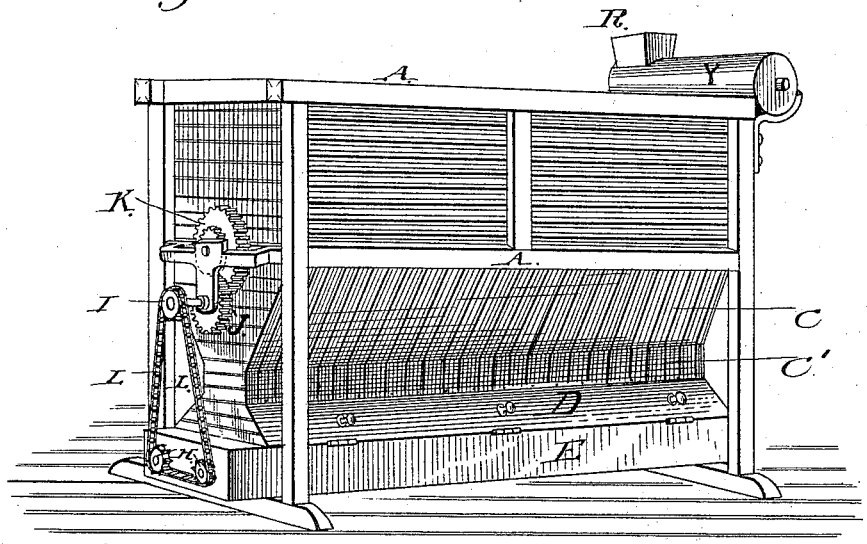
Figure 4:
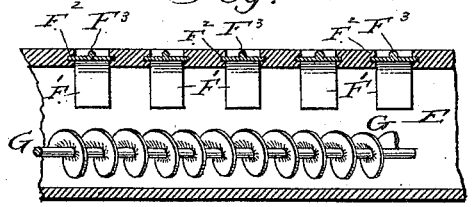
Figure 5:
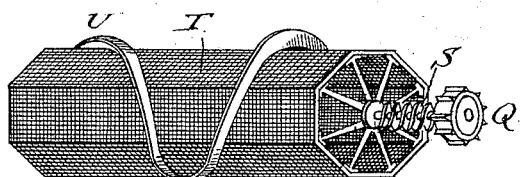
Figure 6:
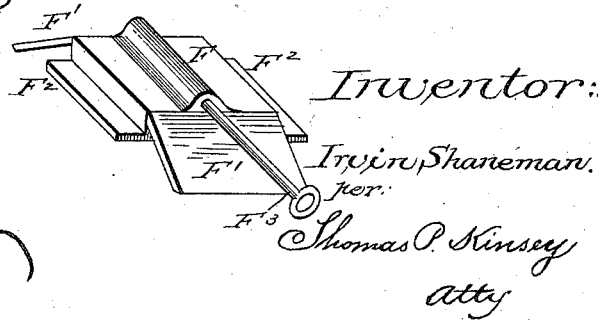

Figure 1, Sheet 1, represents in perspective a front and side view of a bolting-chest, showing the separator attached to the upper part of the same. Fig. 2, Sheet 2, represents in perspective a rear and side elevation of a bolting-chest, showing the arrangement of the conveyers and mode of driving the same. Fig. 3, Sheet 1, is a partial cross-sectional elevation of the bolting-chest, showing the arrangement of the conveyers and my improved valve for the control of the same. Fig. 4, Sheet 2, is a longitudinal section of a portion of the conveyer-box, conveyer, and valves. Fig. 5, Sheet 2, represents the separator detached from its case, showing more clearly the construction of the same. Fig. 6, Sheet 2, is a perspective view of one of the valves detached.

A represents the frame of the bolting-chest; B, the bolt; B', the pulley for driving the same; C, the discharging-hopper; C', the neck of the hopper; D, removable cover; E, conveyer-box; E', central partition; F, valves; F', wings; F², tongues; F³, handle; G, conveyers; H, chain-wheels at rear ends of conveyer-shafts; I, chain-wheel on counter-shaft; J, counter-gear; K, pinion on reel or bolt-shaft; L, chain belt for giving motion to the conveyers; M, chain-wheel for driving the separator; N, a bevel-pinion on the counter-shaft N', driven by the pinion N in gear with bevel-wheel O on the front end of one of the conveyer-shafts; P, a chain belt, transferring motion from wheel M to wheel Q on the end of the separator-shaft; R, receiving-hopper; S, conveyer-screw on separator-shaft, for transferring the flour from the hopper to the interior of the separator-reel; T, a hexagonal or polygonal cross-sectioned form of reel, covered with screen-wire cloth, provided at the receiving end with a portion of a conveyer-screw and hoppers above the same, and having on the exterior or periphery of the reel a spiral thread of metal, U, developed in both a right and left hand direction from the extremities of the reel toward its center. The reel may also have but a single spiral developed from either end, or it may be dispensed with altogether. I however give preference to the double-thread construction. V represents the case of the separator, partly in section; W, the discharge-chute for refuse; X, chute from the separator to the centrifugal bolt; Y, case inclosing feed-screw for carrying flour into the bolting-reel. The throw-valves are made in longitudinal section, in the form of the letter A with the upper portion cut off—thus, ⋂—and are secured to rods projecting outside of the hopper-neck and terminating in a handle. The horizontal portion F of the valve, where it is secured to the handle F³, projects each side of the inclined portion at F², and is fitted in grooves in the intermediate flooring of the hopper-neck, as shown in Fig. 4, Sheet 2. The walls D, forming the lower portion of the neck of the bolting-chest, are inclined inwardly, to give free passage to the flour, and their inclination corresponds with that of the valve-wings, so that the valve when drawn toward or pushed away from the operator shall fit snugly against said inclined portion, and will, when thus operated, change the current of discharge from the bolt-hopper to the right or left longitudinal conveyer, as desired. The outward angle of the hopper-neck, in connection with the covers to the conveyer-boxes, enables me to remove the conveyers without dismantling the chest, simply removing the screws through the ends of the boxes, and the ends themselves permit the withdrawal rearwardly of the conveyer past the front post of the frame, when it can be lifted out of the box with a forward longitudinal movement. Repairs are also facilitated while the conveyers are lying in the box, as the valves do not interfere therewith.

I am aware that I am not the first to use a separator in combination with a centrifugal bolting-reel.

I am also aware that I am not the first to make use of two independent conveyers placed side by side beneath the discharge-hopper; but I believe my arrangement of the valves and hopper-neck in combination with the conveyer-boxes to give a superior result as to handiness of examination and repairs, while my separator from its polygonal form will disintegrate and remove from the flour all that would prove hurtful to the bolting-reel if admitted thereinto.

Having shown my improvement, described its construction and operation, I desire to secure by Letters Patent the following claims thereon:

1. The combination of the bolt, the feed-hopper R, the inclosing-case having central feed opening and discharge, W, the polygonal rotary sieve T, and the reversely-inclined conveyer-blades U, substantially as and for the purpose described.

2. The combination of the bolt, the inclosing-chest having a hopper bottom and neck, C', the inwardly-leaning walls D, the conveyer-box having longitudinal middle partition, and the sliding throw-valve F, made with wings inclined at the same angle as the walls D, substantially as and for the purpose set forth.

3. The combination of the bolt, the inclosing-chest having hopper-bottom, the neck C', the inwardly-leaning walls D, the partitioned conveyer-box, the grooved intermediate flooring in the neck C', and the series of valves F, formed with wings F', inclined parallel with walls D, and handles F³, substantially as and for the purpose set forth.

IRVIN SHANEMAN.

Witnesses:
THOMAS P. KINSEY,
F. PIERCE HUMMEL.